US009163723B2

(12) United States Patent
Prix et al.

(10) Patent No.: US 9,163,723 B2
(45) Date of Patent: Oct. 20, 2015

(54) ACTUATOR SYSTEM FOR A CLUTCH AND A GEAR SWITCH

(75) Inventors: Daniel Prix, Ebental (AT); Dominik Schober, Graz (AT)

(73) Assignee: MAGNA Powertrain AG, Lannach (AT)

( * ) Notice: Subject to any disclaimer, the term of this patent is extended or adjusted under 35 U.S.C. 154(b) by 0 days.

(21) Appl. No.: 13/984,080

(22) PCT Filed: Feb. 13, 2012

(86) PCT No.: PCT/EP2012/052394
§ 371 (c)(1),
(2), (4) Date: Aug. 7, 2013

(87) PCT Pub. No.: WO2012/110446
PCT Pub. Date: Aug. 23, 2012

(65) Prior Publication Data
US 2013/0312562 A1 Nov. 28, 2013

Related U.S. Application Data

(60) Provisional application No. 61/442,429, filed on Feb. 14, 2011.

(30) Foreign Application Priority Data

May 14, 2011 (DE) .......................... 10 2011 105 826

(51) Int. Cl.
*F16H 63/18* (2006.01)
*F16H 61/682* (2006.01)
(Continued)

(52) U.S. Cl.
CPC .............. *F16H 61/682* (2013.01); *F16D 28/00* (2013.01); *F16H 63/18* (2013.01); *F16D 2023/123* (2013.01); *F16H 61/32* (2013.01); *Y10T 74/20073* (2015.01)

(58) Field of Classification Search
CPC ......... F16H 63/18; F16H 63/20; F16H 63/30;
F16H 61/32; F16H 61/30; F16H 61/12;
F16H 61/22; F16H 61/24; F16H 61/0293;
F16H 61/0403; F16H 59/10; F16H 59/04;
F16H 59/042; F16H 59/0204; F16H 59/105;
F16H 59/044; F16H 63/36; F16H 63/302;
F16H 63/34; F16H 2306/00; F16H 2710/08
USPC ........ 74/335, 325, 329, 333, 339, 340, 473.1,
74/473.12, 473.37, 473.24, 473.23
See application file for complete search history.

(56) References Cited

U.S. PATENT DOCUMENTS 1,714,800 A * 5/1929 Minnec ............................ 52/537
5,205,179 A * 4/1993 Schneider ...................... 74/365
(Continued)

FOREIGN PATENT DOCUMENTS

EP 1906064 A1 4/2008

*Primary Examiner* — William Kelleher
*Assistant Examiner* — Jude Agendia
(74) *Attorney, Agent, or Firm* — Jordan IP Law, LLC; Todd A. Vaughn

(57) ABSTRACT

An actuator device configured to actuate a first functional unit and a second functional unit. The actuator device has an actuator motor configured to generate a rotational drive movement, a first shift device assigned to the first functional unit, a second shift device assigned to the second functional unit, and a shift drum which couples the actuator motor and the shift devices in terms of drive. The first shift device is coupled to the shift drum via a first positive control mechanism, and the second shift device is coupled to the shift drum via a second positive control mechanism. By the positive control mechanism, a rotational movement of the shift drum, which can be generated by the rotational drive movement, may be converted into a translatory movement of the first shift device and/or into a translatory movement of the second shift device.

20 Claims, 2 Drawing Sheets

Figure 1:
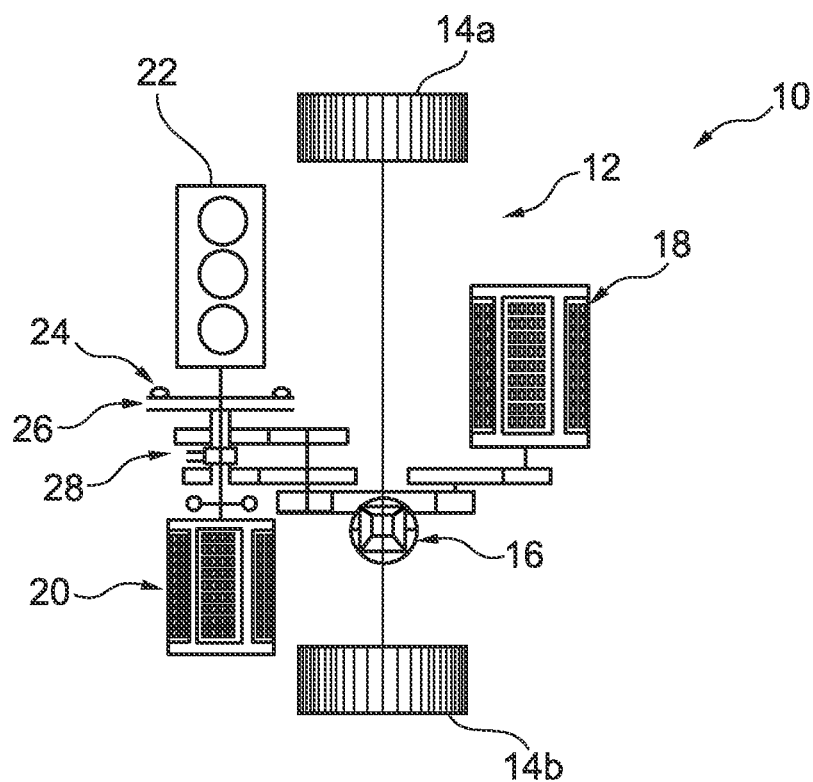

(51) Int. Cl.
*F16D 28/00* (2006.01)
*F16H 61/32* (2006.01)
*F16D 23/12* (2006.01)

(56) References Cited

U.S. PATENT DOCUMENTS

| | | | | |
|---|---|---|---|---|
| 5,967,939 | A * | 10/1999 | Reik et al. | 477/77 |
| 7,107,865 | B2 * | 9/2006 | Tomita et al. | 74/325 |
| 7,762,154 | B2 * | 7/2010 | Murakami et al. | 74/331 |
| 7,770,481 | B2 * | 8/2010 | Takemoto et al. | 74/337.5 |
| 7,866,227 | B2 * | 1/2011 | Mizuno et al. | 74/331 |
| 8,037,779 | B2 * | 10/2011 | Shiozaki et al. | 74/473.36 |
| 8,051,735 | B2 * | 11/2011 | Bender et al. | 74/335 |
| 8,635,927 | B2 * | 1/2014 | Akashi et al. | 74/473.36 |
| 2009/0266192 | A1 * | 10/2009 | Shiozaki et al. | 74/337.5 |
| 2010/0294070 | A1 * | 11/2010 | Akashi et al. | 74/473.36 |

* cited by examiner

ACTUATOR SYSTEM FOR A CLUTCH AND A GEAR SWITCH

CROSS-REFERENCE TO RELATED APPLICATIONS

The present application is a National Stage Application of PCT International Application No. PCT/EP2012/052394 (filed on Feb. 13, 2012), under 35 U.S.C. §371, which claims priority to U.S. Provisional Patent Application No. 61/442,429 (filed on Feb. 14, 2011) and German Patent Application No. DE 10 2011 105 826.9 (filed on May 14, 2011), which are each hereby incorporated by reference in their respective entireties.

TECHNICAL FIELD

The present invention relates to an actuating device for actuating a first functional unit and a second functional unit.

BACKGROUND

Such actuators may be used in a variety of fields, in particular in automotive engineering, for example in hybrid vehicles whose drive trains comprise an electric motor and an internal combustion engine. It may be advantageous for the drivetrain to be configured such that, above a certain speed, only the internal combustion engine drives the motor vehicle. In this configuration of the drivetrain, the rotational drive movement of the internal combustion engine is transmitted to a differential gear of a driven axle via a shift transmission with for example two gear stages in order to keep the rotational speed of the internal combustion engine in an efficient range.

The shift transmission may be assigned a clutch, in particular a dry clutch, for selectively connecting the internal combustion engine to the shift transmission. In many cases, the shift transmission is automated, such that a coupling of the internal combustion engine to the drivetrain and/or a gear stage change can be effected in a convenient and simple manner.

Of particular significance for reliable operation of the hybrid drive of the type described above is an actuator device by means of which the clutch described above can be actuated. Furthermore, an actuator is required which can effect a gear stage change. The two actuators must furthermore be coordinated with one another in an effective manner in order to permit automated operation.

SUMMARY

It is an object of the present invention to provide an actuator device by means of which a first functional unit and a second functional unit can be actuated in a reliable manner. The actuator device should furthermore be of simple construction, robust and inexpensive to produce.

The object as stated above is achieved by means of an actuator device for actuating a first functional unit and a second functional unit, having an actuator motor for generating a rotational drive movement, having a first shift device assigned to the first functional unit, having a second shift device assigned to the second functional unit, and having a shift drum which couples the actuator motor and the shift devices in terms of drive, wherein the first shift device is coupled to the shift drum via a first positive control means, and the second shift device is coupled to the shift drum via a second positive control means, and wherein, by the positive control means, a rotational movement of the shift drum, which can be generated by the rotational drive movement, can be converted into a translatory movement of the first shift device and/or into a translatory movement of the second shift device.

In accordance with the invention, the actuator device has an actuator motor for generating a rotational drive movement, a first shift device assigned to the first functional unit, a second shift device assigned to the second functional unit, and a shift drum which couples the actuator motor and the shift device in terms of drive. The first shift device is coupled to the shift drum via a first positive control means, and the second shift device is coupled to the shift drum via a second positive control means. By the positive control means, a rotational movement of the shift drum, which can be generated by the rotational drive movement, can be converted into a translatory movement of the first shift device and/or into a translatory movement of the second shift device.

The construction of the actuator device in accordance with the invention is structurally simple and at the same time reliable because the conversion of a rotational input movement by means of the shift drum is converted by the first and the second positive control means into translatory movements of the shift devices, which can ultimately be used for actuating the functional units. The respective configuration of the two positive control means defines the form in which the rotational movement of the shift drum is converted into the respective translatory movement. It is possible for the positive control means to generate different translatory movements independently of one another. The translatory movements may for example be characterized by different amplitudes, speeds, movement durations and/or accelerations.

In one particularly compact embodiment, the shift drum, the first shift device and/or the second shift device are arranged coaxially. The shift drum may be arranged between the first shift device and the second shift device in a radial direction. A design which is compact in an axial direction is attained if the first shift device and the second shift device at least partially overlap in an axial direction.

One of the shift devices may be formed, at least in sections, as a sliding sleeve which surrounds the shift drum at least in sections. Alternatively or in addition, one of the shift devices may have a piston section which is arranged at least partially in a section, which is formed in the manner of a hollow shaft, of the shift drum.

The first positive control means and the second positive control means may be designed such that either a translatory movement of the first shift device or a translatory movement of the second shift device can be generated. For example, through the design of the positive control means, initially the first functional unit is actuated by a translatory movement of the first shift device. Only after the completion of the actuation of the first functional unit is an actuation of the second functional unit effected by a translatory movement of the second shift device. In certain applications, it may however also be desirable for the positive control means to generate translatory movements of the shift devices which partially or fully overlap in terms of time.

In one structurally simple and reliable embodiment of the first and/or second positive control means, these have in each case at least one control groove and one pin which engages into the control groove. The control groove is for example arranged on the shift drum while the pin is arranged on the shift device, or vice versa.

The control groove may have, in sections in the circumferential direction of the shift drum or of the shift device depending on which of the stated components said control groove is assigned to, a dwell portion which, when passed through by the pin during a rotational movement of the shift drum, defines a rest position of the corresponding shift device in relation to the shift drum. Therefore, as the pin passes through the dwell portion during a relative rotation of the shift drum and shift device, no translatory movement of the corresponding shift device is generated.

In certain situations, an installation space available for the actuator device is very restricted. In such cases, it may be advantageous for the axis of rotation of the drive motor and the axis of rotation of the shift drum to be arranged perpendicular to one another. The shift drum is for example coupled to a drive shaft of the actuator motor via a worm gearing.

The first functional unit may be a gear change device, in particular a shift fork for effecting a gear stage change in a transmission having at least two transmission gear stages. The second functional unit may be a clutch. The actuator device permits both an actuation of the clutch and also a gear stage change. The positive control means are in this case coordinated with one another in such a way that the second shift device generates an opening of the clutch before the first shift device initiates a gear stage change. After the gear stage change is complete, the clutch is closed again by the second shift device. It is self-evident that the translatory movements of the first shift device and of the second shift device may overlap in terms of time, as long as it is ensured that the clutch is already open to such an extent that a gear stage change is possible without problems, and that a gear stage change is already complete when the clutch begins to engage.

The present invention also relates to a drivetrain of a motor vehicle, in particular of a hybrid vehicle, comprising an internal combustion engine, a transmission having at least two transmission gear stages, and a clutch for severing the drive connection between the internal combustion engine and the transmission, wherein an actuator device in accordance with at least one of the embodiments described above is provided, by means of which actuator device both an actuation of the clutch and also a change between the transmission gear stages of the transmission can be effected.

Further embodiments of the invention will emerge from the description, from the figures and from the claims.

DRAWINGS

The present invention will be explained below merely by way of example on the basis of an advantageous embodiment and with reference to the appended drawings, in which:

FIG. 1 illustrates a part of a drivetrain of a hybrid vehicle.

Figure 2:
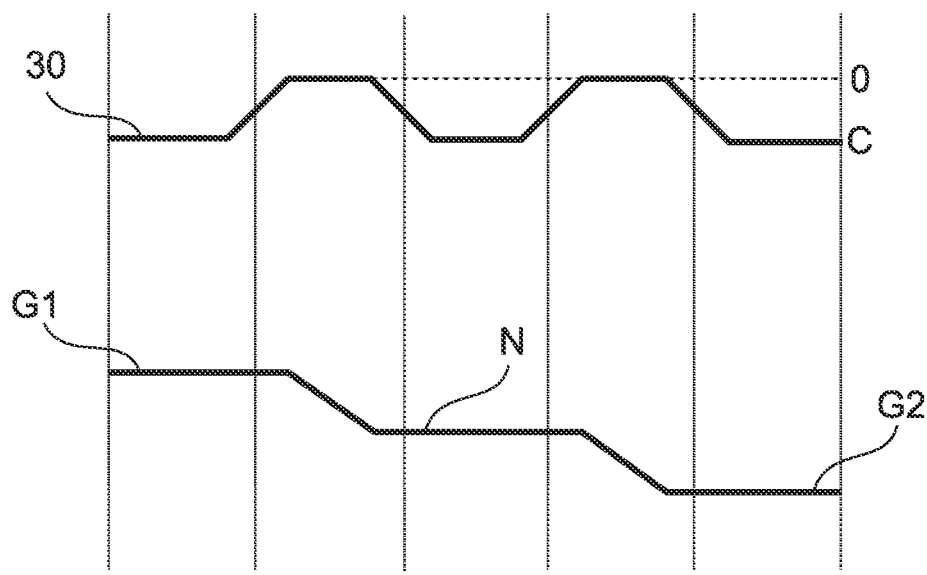

FIG. 2 schematically illustrates gear stage changes of a transmission of the drivetrain, and a profile with respect to time of the state of a clutch assigned to the transmission.

Figure 3:
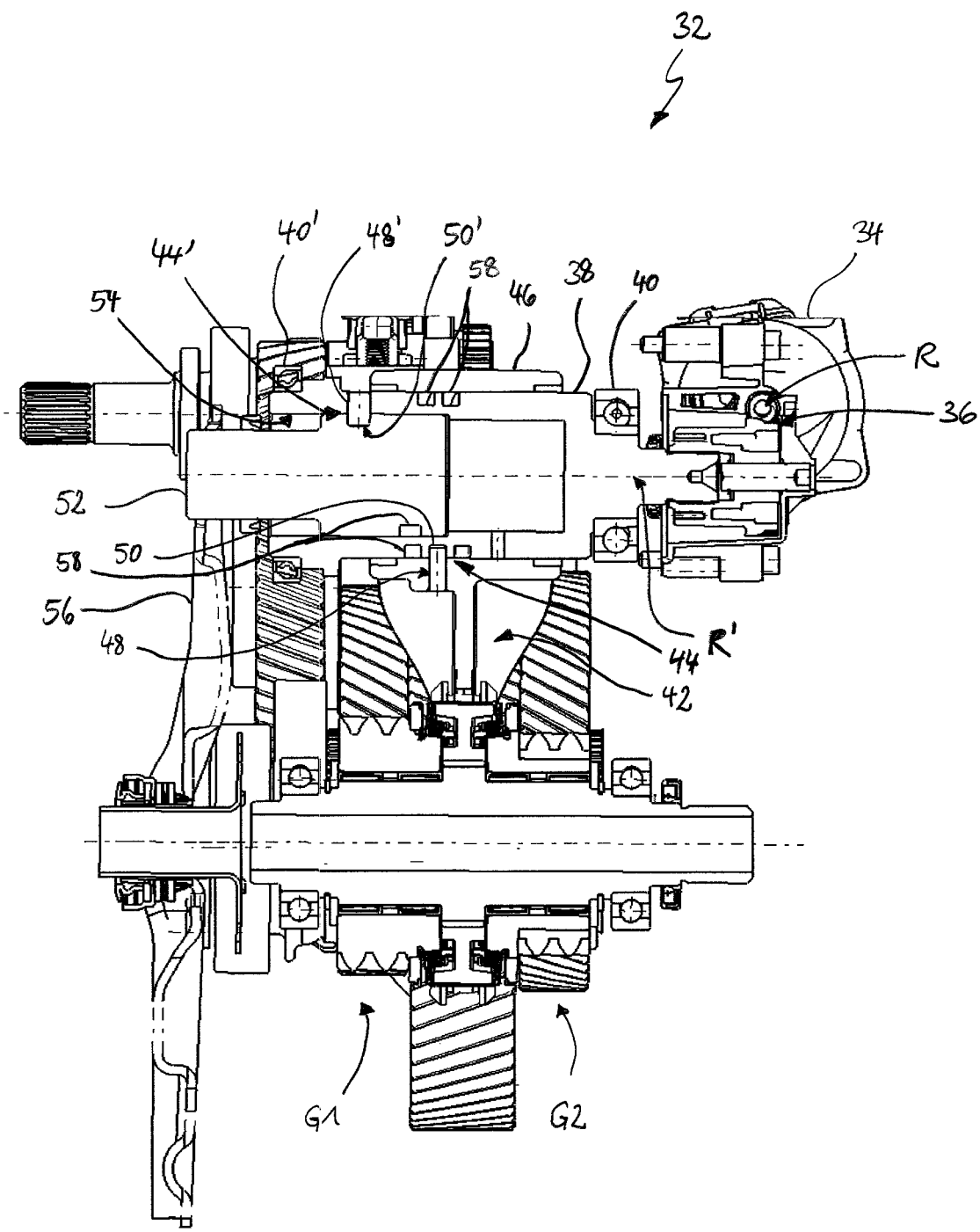

FIG. 3 illustrates a section through an embodiment of the actuator device in accordance with the invention.

DESCRIPTION

FIG. 1 illustrates a part of a drivetrain 10 of a hybrid vehicle. The drivetrain 10 comprises a driven axle 12 with wheels 14a, 14b which are coupled to one another by a differential gear 16. The driven axle 12 may be driven by an electric motor 18. The electric energy required for this purpose is extracted from a battery (not shown).

For charging the battery, a generator 20 is provided which, when there is a demand for the generation of electrical energy, is driven by an internal combustion engine 22. To dampen rotational movements of the internal combustion engine 22, a dual-mass flywheel 24 is provided. Furthermore, the internal combustion engine 22 can be separated from the other components of the drivetrain 10 by a clutch 26.

At relatively high speeds of the hybrid vehicle, for example, at speeds above 70 km/h, it may be advantageous for the driven axle 12 to be driven by the internal combustion engine 22 rather than by the electric motor 18. This increases the overall efficiency of the drivetrain 10 because, at relatively high speeds, and the associated torque demands, efficient operation of the internal combustion engine 22 is possible. An "indirect route" which reduces efficiency in such situations, specifically a conversion of the drive torque of the internal combustion engine 22 into electrical energy followed by a conversion of the electrical energy into a drive torque by the electric motor 18, is thereby avoided.

For the efficient operation of the internal combustion engine 22, the internal combustion engine 22 may be coupled in terms of drive to the differential gear 16 of the driven axle 12 via a transmission 28 having two or more gear stages. In accordance with the power demand, the suitable transmission gear stage is selected in order to enable the internal combustion engine 22 to be operated as efficiently as possible at all times.

Reliable operation of the drivetrain 10 assumes that a gear stage change in the transmission 28 can be carried out reliably. Since the gear stage change should take place in an automated fashion, a suitable actuator is required which actuates both the clutch 26 and also a gear change device of the transmission 28. The stated actuator must, however, not only be reliable, but rather must also be compact and inexpensive to produce.

FIG. 2 illustrates, in the upper region, the profile with respect to time of a state 30 of the clutch 26. It can be seen in the lower region of FIG. 2 that the gear stage changes between a first gear stage G1 and a neutral state N or between the neutral state N and a second gear stage G2 take place in each case when the clutch 26 is in an open state O. During a change of state of the clutch 26 from a closed state C into the open state O, or vice versa, no gear stage change takes place. In other words, an opening and a closing of the clutch 26 and the actuation of a gear change device do not take place simultaneously.

FIG. 3 illustrates an embodiment of an actuator 32 by means of which both the clutch 26 and also the above-mentioned gear change device can be actuated. The actuator 32 comprises a motor 34, the axis of rotation R of which is arranged perpendicular to the plane of the drawing. A rotational drive movement of the motor 34 is transmitted via a worm gearing 36 to a shift drum 38, the axis of rotation R' of which is arranged perpendicular to the axis of rotation R. The shift drum 38 is mounted rotatably and in an axially fixed manner in a housing by means of bearings 40, 40'.

The shift drum 38 is coupled to a shift fork 42. A selection between two gear stages G1, G2 of the transmission 28 can be made by means of the shift fork 42. The transmission 28 may also be placed into the neutral state N in which no transmission of torque takes place from the internal combustion engine 22 to the differential gear 16.

The coupling between the shift drum 38 and the shift fork 42 is realized by a positive control means 44 which comprises a pin 48 arranged on a section, in the form of a sliding sleeve 46, of the shift fork 42. The pin 48 in turn engages into a control groove 50 which is of complementary design and which is formed on an outer circumference of the shift drum 38. Since a profile of the control groove 50 varies at least in sections in the circumferential direction, a rotation of the shift drum 38 leads to a translatory movement of the sliding sleeve

46, and thus, ultimately of the shift fork 42, whereby one of the gear stages G1, G2 or a neutral position N of the transmission 28 can be selected.

A rotation of the shift drum 38, however, leads not only to a translatory movement of the shift fork 42. Specifically, by way of a positive control means 44', an actuating piston 52 is moved in an axial direction, that is to say along the axis of rotation R'. The actuating piston 52 is arranged in a section 54, which is in the form of a hollow shaft, of the shift drum 38. The positive control means 44' has a pin 48' which is arranged on the shift drum 38 and which points into the interior of the hollow shaft section 54, which pin engages into a control groove 50' arranged on the outer circumference of the actuating piston 52. A translatory movement characteristic of the actuating piston 52 as a function of a rotational movement of the shift drum 38 is defined by means of the profile of the control groove 50', analogously to the situation with the positive control means 44. A translation of the actuating piston 52 leads, via an actuating lever 56, to an actuation of the clutch 26.

In summary, it can be stated that only one motor 34 is necessary to reliably effect both an actuation of the clutch 26 and also an automated gear stage change. This is made possible by means of the shift drum 38 which, via the positive control means 44, 44', interacts with the shift fork 42 and with the actuating piston 52 respectively and causes these to perform a respective translatory movement. A suitable configuration of the control grooves 50, 50' of the positive control means 44, 44' permits a reliable characterization of the translatory movement of the shift fork 42 and of the actuating piston 52 as a function of a change in rotational angle of the shift drum 38. In other words, in every rotational position of the shift drum 38, it is defined what position the shift fork 42 and the actuating piston 52 are in respectively.

The actuator 32 has a compact design. The radial "nesting" of the sliding sleeve 46, of the shift drum 38 and of the actuating piston 52 makes a design possible which is short in particular in an axial direction and which, moreover, is highly robust. Low-fiction relative movements between the stated components 46, 38, 52 are ensured by means of plain bearing bushings 58.

The actuator 32 has duly been described by way of example in conjunction with a drivetrain of a hybrid vehicle, though it is self-evident that the actuator 32 may also be used in other fields in which two functional units must be reliably actuated.

LIST OF REFERENCE SIGNS

10 Drivetrain
12 Driven axle
14a, 14b Wheel
16 Differential gear
18 Electric motor
20 Generator
22 Internal combustion engine
24 Dual-mass flywheel
26 Clutch
28 Transmission
30 Profile with respect to time of a state of the clutch 26
32 Actuator
34 Motor
36 Worm gearing
38 Shift drum
40, 40' Bearing
42 Shift fork
44, 44' Positive control means
46 Sliding sleeve
48, 48' Pin
50, 50' Control groove
52 Actuating pistons
54 Hollow shaft section
56 Actuating lever
58 Plain bearing bushing
O Open state
C Closed state
N Neutral state
R, R' Axis of rotation
G1, G2 Gear stage

What is claimed is:

1. An actuator device to actuate a clutch and a gear change device which effectuates a gear stage change in a transmission, the actuator device comprising:
    a motor;
    a shift drum having a hollow shaft section and which is rotatably moveable by the motor;
    a first shift device operatively connected to the gear change device and arranged coaxially with respect to and at least partially surrounding the shift drum;
    a second shift device operatively connected to the clutch and arranged coaxially with respect to the shift drum in the hollow shaft section of the shift drum;
    a first positive control mechanism to couple the first shift device to the shift drum and convert a rotational movement of the shift drum into a translatory movement of the first shift device so as to select one of the gear stages or a neutral position of the transmission; and
    a second positive control mechanism to couple the second shift device to the shift drum and convert a rotational movement of the shift drum into a translatory movement of the second shift device and thereby actuate the clutch.

2. The actuator device of claim 1, wherein the shift drum, the first shift device and the second shift device are arranged coaxially.

3. The actuator device of claim 1, wherein the shift drum is arranged between the first shift device and the second shift device in a radial direction.

4. The actuator device of claim 1, wherein:
    the shift drum, the first shift device and the second shift device are arranged coaxially; and
    the shift drum is arranged between the first shift device and the second shift device in a radial direction.

5. The actuator device of claim 1, wherein the first shift device and the second shift device at least partially overlap in an axial direction.

6. The actuator device of claim 1, wherein one of the first shift device and the second shift device comprises a sliding sleeve which surrounds the shift drum at least partially.

7. The actuator device of claim 1, wherein the first positive control mechanism comprises at least one first control groove arranged on the shift drum and a first pin arranged on the first shift device and which engages into the first control groove.

8. The actuator device of claim 7, wherein the first control groove has, in sections in a circumferential direction of the shift drum or of the first shift device, a first dwell portion which, when passed through by the first pin during a rotational movement of the shift drum, defines a rest position of the first shift device in relation to the shift drum.

9. The actuator device of claim 1, wherein the second positive control mechanism comprises at least one second control groove arranged on the second shift device and a second pin which engages into the control groove and which is arranged on the shift drum.

10. The actuator device of claim 1, wherein the second control groove has, in sections in a circumferential direction of the shift drum or of the second shift device, a second dwell portion which, when passed through by the second pin during a rotational movement of the shift drum, defines a rest position of the second shift device in relation to the shift drum.

11. The actuator device of claim 1, wherein an axis of rotation of the motor and the axis of rotation of the shift drum are arranged perpendicular to one another.

12. The actuator device of claim 1, further comprising worm gearing to couple the shift drum to the motor.

13. The actuator device of claim 12, wherein the worm gearing is to couple the shift drum to a drive shaft of the motor.

14. A drive train for a motor vehicle, the drive train comprising:
an internal combustion engine;
a transmission having transmission gear stages;
a clutch to sever a drive connection between the internal combustion engine and the transmission;
a gear change device to effectuate a gear stage change in the transmission; and
an actuator device to actuate the clutch and the gear change device, the actuator device including:
a motor;
a shift drum having a hollow shaft section and which is rotatably moveable by the motor;
a first shift device operatively connected to the gear change device and arranged coaxially with respect to and at least partially surrounding the shift drum;
a second shift device operatively connected to the clutch and arranged coaxially in the hollow shaft section of the shift drum;
a first positive control mechanism to couple the first shift device to the shift drum and convert a rotational movement of the shift drum into a translatory movement of the first shift device so as to select one of the gear stages or a neutral position of the transmission; and
a second positive control mechanism to couple the second shift device to the shift drum and convert a rotational movement of the shift drum into a translatory movement of the second shift device and thereby actuate the clutch.

15. A drivetrain, comprising:
an internal combustion engine;
a transmission having at least two transmission gear stages;
a clutch to sever a drive connection between the internal combustion engine and the transmission;
a gear change device having a shift fork to effectuate a gear stage change in the transmission; and
an actuator device to actuate the clutch and the gear change device, the actuator device including:
a shift drum which is rotatably moveable by a motor;
a first shift device including a sliding sleeve operatively connected to the shift fork and arranged coaxially with to at least partially surround the shift drum;
a second shift device having an actuating piston operatively connected to the clutch and arranged coaxially in a hollow shaft section of the shift drum;
a first positive control mechanism to couple the sliding sleeve to the shift drum and convert a rotational movement of the shift drum into a translatory movement of the sliding sleeve so as to select one of the gear stages or a neutral position of the transmission; and
a second positive control mechanism to couple the actuating piston to the shift drum and convert a rotational movement of the shift drum into a translatory movement of the actuating piston and thereby actuate the clutch.

16. The drivetrain of claim 15, wherein:
the first positive control mechanism comprises a pin arranged on the sliding sleeve; and
the shift drum comprises a control groove on an outer circumference thereof which is engaged by the pin.

17. The drivetrain of claim 15, wherein:
the second positive control mechanism comprises a pin arranged to extend into the interior of the hollow shaft section,
the actuating piston comprises a control groove on the outer circumference thereof which is engaged by the pin.

18. The drivetrain of claim 15, wherein a rotational position of the shift drum defines a position of the shift fork and the actuating piston, respectively.

19. The drivetrain of claim 15, wherein the shift drum, the first shift device and the second shift device are arranged coaxially.

20. The drivetrain of claim 15, wherein the shift drum is arranged between the first shift device and the second shift device in a radial direction.

* * * * *